US006942599B1

(12) United States Patent  
Racine

(10) Patent No.: US 6,942,599 B1
(45) Date of Patent: Sep. 13, 2005

(54) CONTROL PANEL FOR USE WHILE EXERCISING

(76) Inventor: Jon Racine, 353 Hazard Ave., Enfield, CT (US) 06082

( * ) Notice: Subject to any disclaimer, the term of this patent is extended or adjusted under 35 U.S.C. 154(b) by 16 days.

(21) Appl. No.: 10/661,286

(22) Filed: Sep. 12, 2003

(51) Int. Cl.[7] .............................................. A63B 22/00
(52) U.S. Cl. ............................... 482/8; 482/1; 482/900
(58) Field of Search ............................. 482/51, 54, 57, 482/1–9, 900–902

(56) References Cited

U.S. PATENT DOCUMENTS

| 4,413,821 A | 11/1983 | Centafanti | 272/69 |
| 5,137,501 A | 8/1992 | Mertesdorf | 482/57 |
| 5,591,104 A | 1/1997 | Andrus et al. | 482/7 |
| 6,626,799 B2 * | 9/2003 | Watterson et al. | 482/4 |

* cited by examiner

Primary Examiner—Glenn E. Richman
(74) Attorney, Agent, or Firm—Goldstein Law Offices PC.

(57) ABSTRACT

A control panel that that displays workout information and provides audio entertainment to a user while exercising. The control panel has an upper surface, a side surface, an interior housing, an AM/FM radio and a CD player. The upper surface of the control panel contains an exercise switchpad, a main exercise display screen, first and second exercise display windows, a multi-position lever switch, a frequency display window, two pushbutton frequency selection switches, two pushbutton volume adjustment switches and an audio jack. The upper surface is in electrical communication with the radio and the CD player, both of which are located in the interior housing. A CD drive is located in the side surface of the control panel.

8 Claims, 3 Drawing Sheets

CONTROL PANEL FOR USE WHILE EXERCISING

BACKGROUND OF THE INVENTION

1. Field of the Invention

The invention generally relates to a control panel, and in particular it relates to a control panel that displays workout information and provides audio entertainment while a user is exercising.

2. Description of the Related Art

Most Americans are acutely aware of the significant health benefits to be gained from regular exercise. Although American participation in most forms of exercise has remained relatively constant over the past several years, there has been a substantial increase in the number of people who engage in cardiovascular exercise. In a recent year, an estimated 32.9 million Americans utilized cardiovascular equipment, such as stationary bicycles, Stairmasters and treadmills, at least once. This represents an increase of approximately three million people more than in the previous year. According to the Boston-based International Health, Racquet and Sportsclub Association, the number of people who used cardiovascular machines in health clubs has increased from 1.1 million in 1987 to 7.4 million in 2000. In fact, stationary bicycles, Stairmasters and treadmills are the most-used equipment in health clubs today.

Exercise devices that focus on cardiovascular health have numerous advantages, including their ability to customize a workout regimen and their adaptability to indoor use. However, exercise enthusiasts have frequently and loudly complained of boredom when utilizing cardiovascular workout equipment. This boredom is often deep and persistent. It is also potentially dangerous. Boredom can lull a user into a state of semi-consciousness and cause him injury due to improper use of the exercise machine. Many health clubs have sought to alleviate this problem by placing a radio or television set in the immediate vicinity of cardiovascular exercise machines.

U.S. Pat. No. 5,137,501 to Mertesdorf ("Mertesdorf") teaches a highly complex process for supporting fitness training by playing music that involves a person repeating movement cycles periodically, and a device for implementing the process. However, the disclosures of Mertesdorf do not allow music to be played during periods in which the user is not actively exercising, such as when he is taking a break from his regimen.

U.S. Pat. No. 4,413,821 to Centafanti ("Centafanti") discloses a treadmill having support posts that hold a tape deck player and detachable stereo receivers. However, Centafanti does not provide means for displaying information regarding the progress of a user's workout.

U.S. Pat. No. 5,591,104 to Andrus et al. ("Andrus") teaches a complex physical exercise video system. However, the system of Andrus does not contain any internal device that provides audio entertainment to the user, such as an AM/FM radio or a CD player.

While these devices may be suitable for the particular purposes employed, or for general use, they would not be as suitable for the purposes of the present invention as disclosed hereafter.

SUMMARY OF THE INVENTION

It is an object of the invention to provide a control panel that is compatible with exercise equipment that specifically improves the cardiovascular health of a user. Accordingly, the control panel is designed to be mounted onto stationary bicycles, Stairmasters and treadmills.

It is another object of the invention to provide a control panel that provides audio entertainment to a user while he is working out. Accordingly, the control panel contains an internal AM/FM radio and an internal CD player, and means for allowing the user to selectively play them.

It is a further object of the invention to provide a control panel that allows an informed user to select an appropriate exercise regimen. Accordingly, the control panel contains a switchpad that allows the user to specify various parameters of the workout, including its speed, duration and simulated terrain.

It is a further object of the invention to provide a control panel that graphically and textually displays accurate information regarding the progress a user is making in his workout. Accordingly, the control panel contains a main display screen and two display windows that inform the user about the effectiveness of his exercise routine.

The invention is a control panel that that displays workout information and provides audio entertainment to a user while he is exercising. The control panel has an upper surface, a side surface, an interior housing, an AM/FM radio and a CD player. The upper surface of the control panel contains an exercise switchpad, a main exercise display screen, first and second exercise display windows, a multiposition lever switch, a frequency display window, two pushbutton frequency selection switches, two pushbutton volume adjustment switches and an audio jack. The upper surface is in electrical communication with the radio and the CD player, both of which are located in the interior housing. A CD drive is located in the side surface of the control panel.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
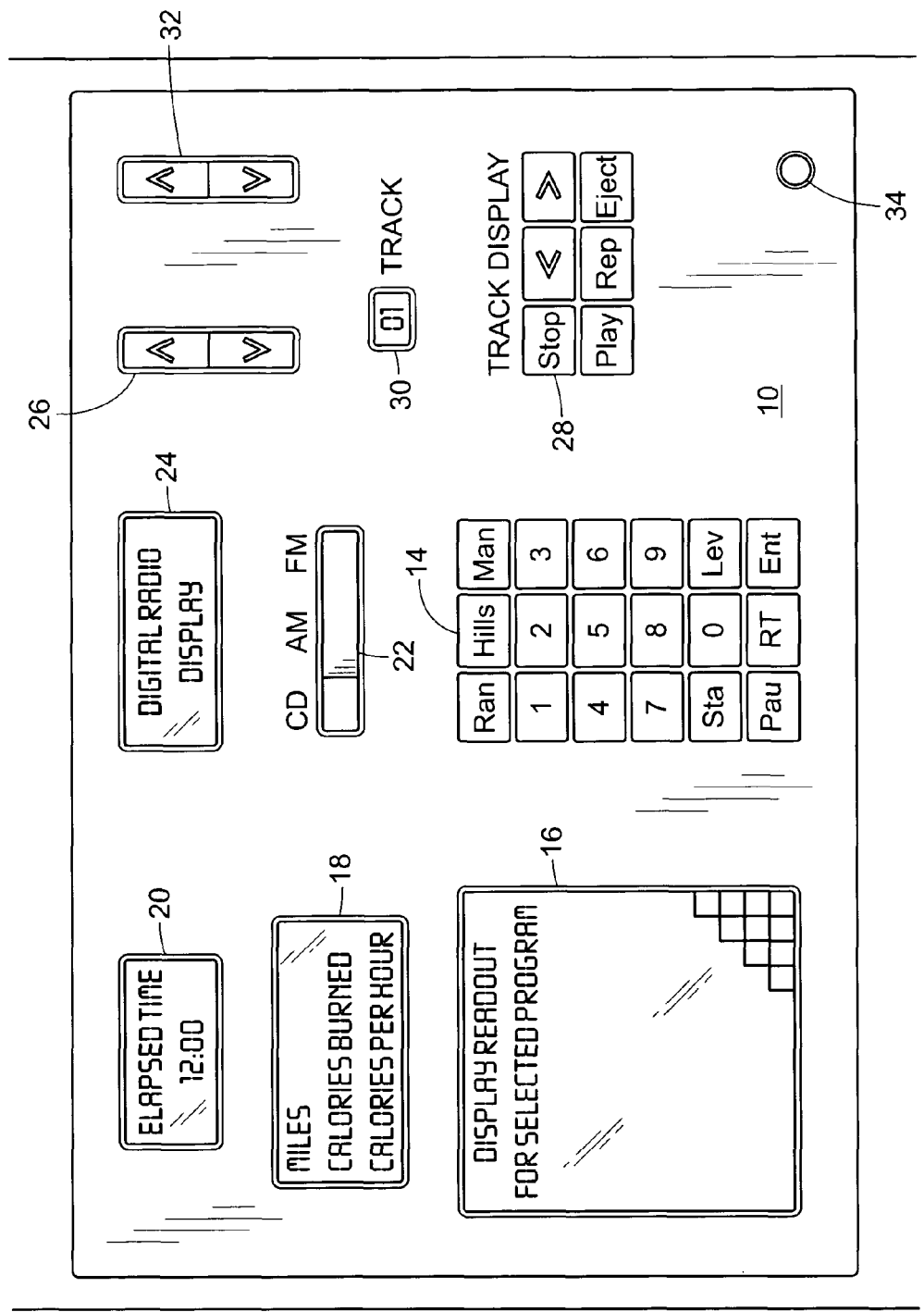
FIG. 1 is a front plan view of the upper surface of the control panel.

FIG. 1 depicts the upper surface 10 of a control panel 12 according to the present invention. An exercise switchpad 14 with numerous pushbutton switches is preferably located near the center of upper surface 10. Some of the pushbutton switches have textual designations and activate specific modes of operation of the machine onto which control panel 12 is mounted. Other pushbutton switches have numerical designations and electronically input specified numerical values for quantities such as the speed and duration of the workout. An informed user is well aware of his personal information that is relevant to determining what constitutes an appropriate exercise routine for him. Such data may include his medical history, his current cardiovascular health, his immediate and long-term objectives and the extent to which he currently engages in other forms of exercise. Based upon all of these factors, and more, a user depresses the desired pushbutton switches on exercise switchpad 14 and exercises according to the selected regimen.

Graphical readouts based upon the input of the user are presented on a main exercise display screen 16. If a simulated hilly terrain configuration is selected via exercise switchpad 14, for example, exercise display screen 16 might illustrate the relative postion of the user with respect to the hills and the landscape that must be traversed before the routine is completed. Textual information regarding the user's regimen is indicated in first exercise display window 18 and second exercise display window 20. For instance, as shown in FIG. 1, first exercise display window 18 can present the number of simulated miles traveled by the user, the number of calories burned by the user and the rate at which the user burned calories during his workout. Second exercise display window 20 can illustrate, for example, the amount of time that has elapsed since the user began his regimen.

A radio and a compact disc ("CD") player are located inside the housing of control panel 12. The user can selectively activate the radio or the CD player by sliding a multi-position lever switch 22. In the preferred embodiment, lever switch 22 is positioned near the center of upper surface 10 and the user can choose one of the following three positions thereof: "CD", which activates the CD player; "AM", which activates the AM broadcast band of the radio; and "FM", which activates the FM broadcast band of the radio. If the user slides lever switch 22 to either the "AM" position or the "FM" position, the frequency of the radio station that is currently playing is digitally presented in a frequency display window 24, which is preferably located near the center of upper surface 10. Bright light emitting diodes are positioned within frequency display window 24 and allow the user to easily discern the operative radio frequency. The user can navigate the available radio channels by depressing two pushbutton frequency selection switches 26, one of which is labeled with an upward arrow and one of which is labeled with a downward arrow. When the user depresses the upward arrow frequency selection switch, continuously higher radio frequencies are played. When the user depresses the downward arrow frequency selection switch, continuously lower radio frequencies are played.

In addition, the upper surface of control panel 12 contains a set of pushbutton switches on a CD switchpad 28 through which the user can regulate the operation of the CD player. The user can depress switches on CD switchpad 28 to play earlier tracks on the CD that is inside the CD player, to play subsequent tracks on the CD, to play the currently selected track on the CD, stop the CD, replay tracks on the CD that were played previously and eject the CD from the CD player. The CD track number that is played at any one time is digitally presented in a CD track display window 30. The upper surface of control panel 12 also contains two pushbutton volume adjustment switches 32 and an audio jack 34. The user can employ volume adjustment switches 32 irrespective of the position of lever switch 22. One volume adjustment switch is labeled with an upward arrow and the other volume adjustment switch is labeled with a downward arrow. When the user depresses the upward arrow volume adjustment switch, the sound emanating from the radio or CD player becomes increasingly loud. When the user depresses the downward arrow volume adjustment switch, the sound emanating from the radio or CD player becomes increasingly soft.

Figure 2:
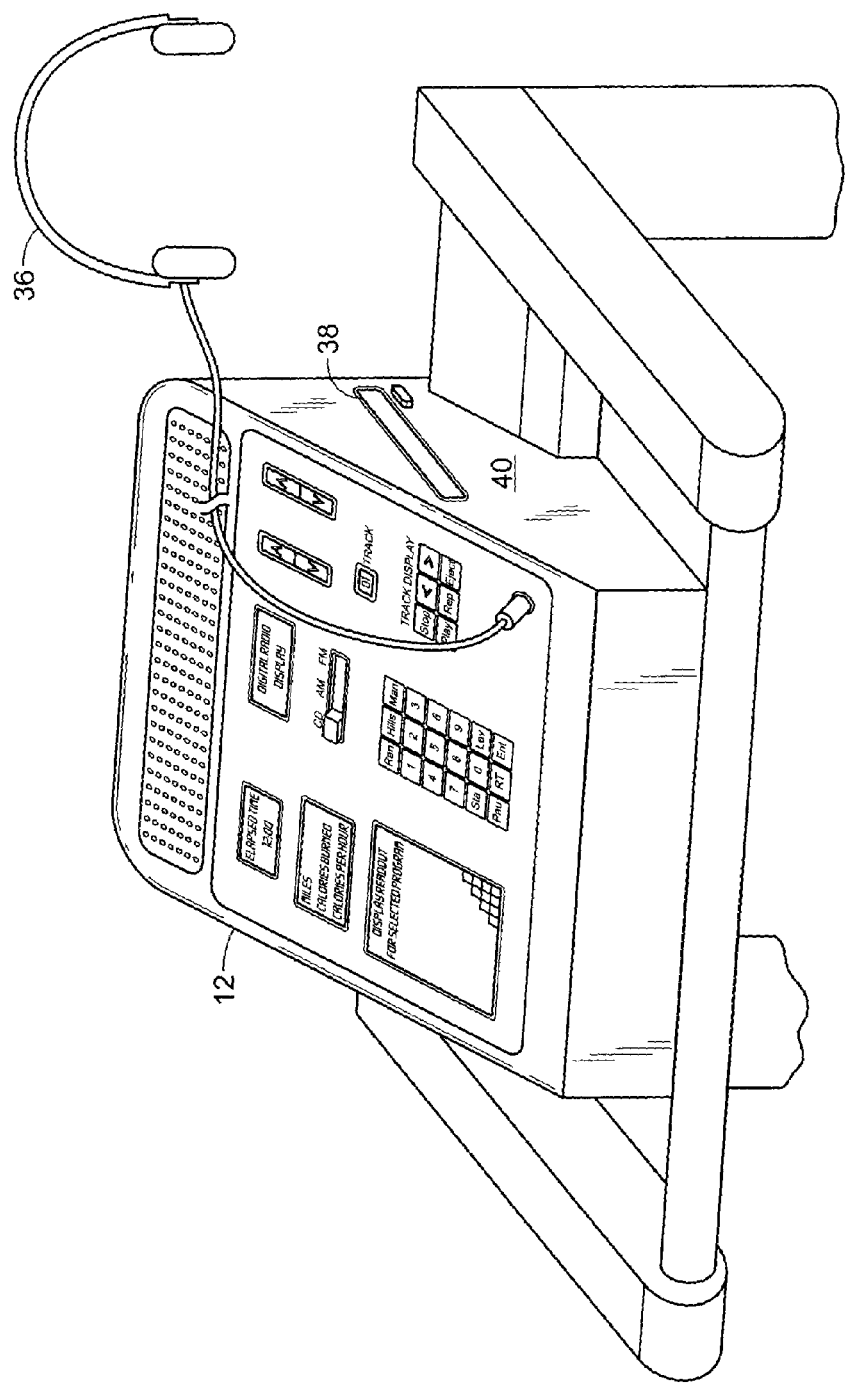
FIG. 2 is an elevated perspective view of the control panel mounted onto a cardiovascular exercise machine.

FIG. 2 illustrates control panel 12 mounted onto a cardiovascular exercise machine. A pair of headphones 36 can be inserted into audio jack 34 to allow the user to privately listen to music from either the radio or the CD player. In order to utilize the CD player, the user selects a CD to which he wants to listen and inserts it into a CD drive 38 in a side surface 40 of control panel 12. After he has listened to the CD, he ejects the CD from CD drive 38.

Figure 3:
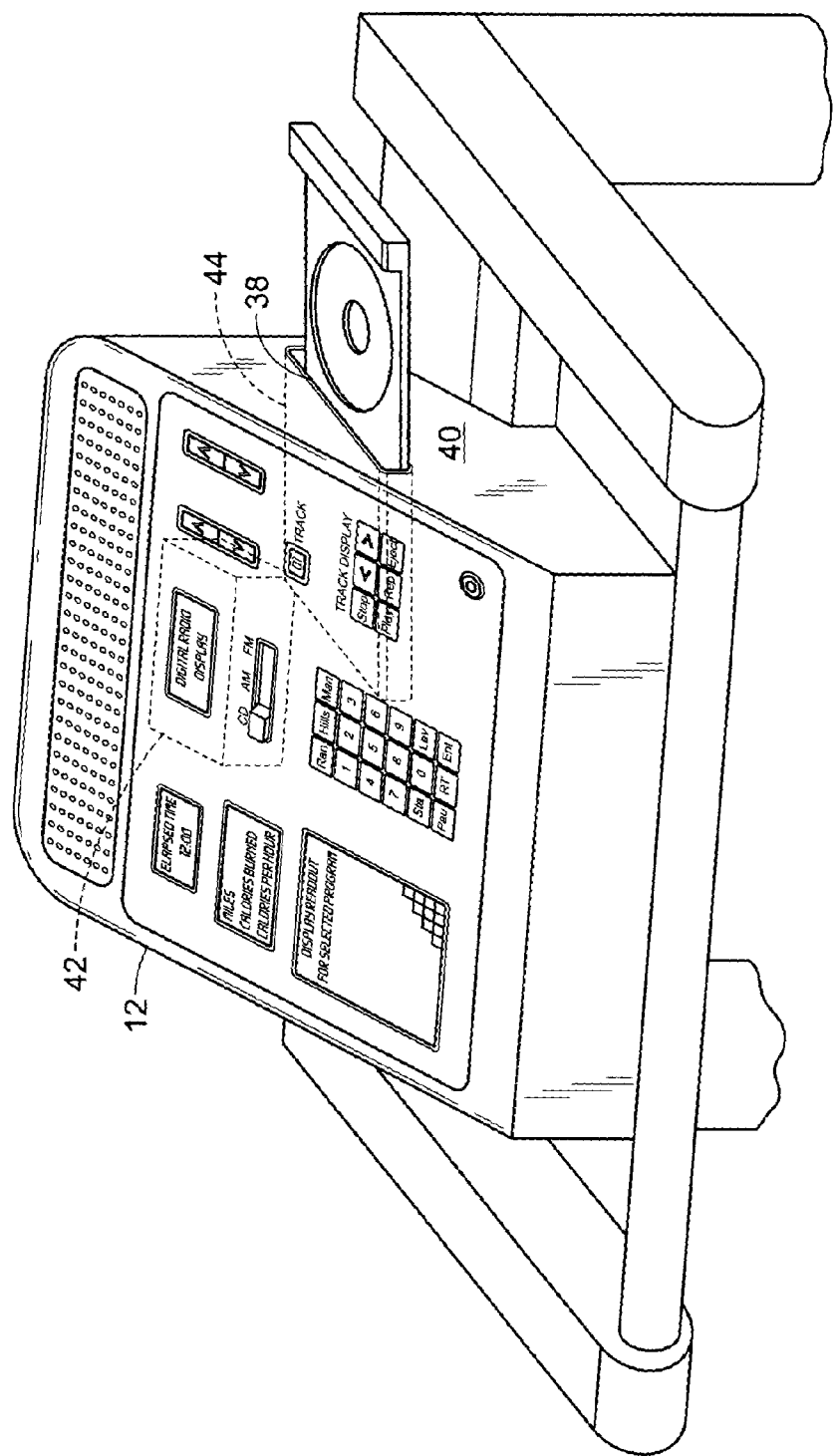
FIG. 3 is an elevated perspective view of the mounted control panel with the CD drive open.

FIG. 3 depicts mounted control panel 12 with the CD drive 38 open. Radio 42 and CD player 44 are located in the interior housing of control panel 12 and are represented by dashed lines which indicate that they are hidden from exterior view. Radio 42 and CD player 44 are in electrical communication with upper surface 10.

In conclusion, herein is presented a control panel for use while exercising. The invention is illustrated by example in the drawing figures, and throughout the written description. It should be understood that numerous variations are possible, while adhering to the inventive concept. Such variations are contemplated as being a part of the present invention.

What is claimed is:

1. A control panel for mounting onto an exercise machine which specifically improves the cardiovascular health of a user during a workout, comprising an upper surface, a side surface, an interior housing, a radio which tunes AM and FM bands at various frequencies and volumes, and a compact disc player which plays tracks on a compact disc, each track having a distinct track number, wherein the upper surface contains a) an exercise switchpad that has a plurality of switches which electrically input specified numerical values when depressed by the user and activate various modes of operation of the exercise machine to determine a workout for the user, b) a main exercise display screen that graphically presents data relevant to the workout of the user, c) a first exercise window that textually presents information relevant to the workout of the user, d) a second exercise window that textually presents information relevant to the workout of the user, e) a lever switch that selectively activates one of the radio and the compact disc player when operated by the user, f) two pushbutton frequency selection switches that navigate among available radio channels when depressed by the user, g) a frequency display window that digitally indicates the frequency at which the radio broadcasts at a particular time, h) a compact disc switchpad having a plurality of switches that allow the user to select modes of operation of the compact disc player, i) a compact disc track display window that digitally indicates a current track number that is associated with the compact disc played by the compact disc player, j) two pushbutton volume adjustment switches that increase and decrease the volume of the radio and compact disc player when depressed by the user, and k) an audio jack, into which the user can insert a pair of headphones to listen to music from the radio or compact disc player, and wherein the upper surface is in electrical communication with the radio and the compact disc player, both of which are located in the interior housing, and wherein a compact disc drive is located in the side surface.

2. The control panel as recited in claim 1, wherein the first exercise window displays the number of simulated miles traveled by the user, the number of calories burned by the user, and the rate at which the user burned calories during his workout.

3. The control panel as recited in claim 2, wherein the second exercise window displays time that has elapsed since the user began his workout.

4. The control panel as recited in claim 3, wherein the lever switch has three possible positions: "CD", which activates the compact disc player; "AM", which activates the AM broadcast band of the radio; and "FM", which activates the FM broadcast band of the radio.

5. The control panel as recited in claim 4, wherein the compact disc switchpad has switches that, when depressed by the user, play earlier tracks on the compact disc, play subsequent tracks on the compact disc, play a currently selected track on the compact disc, stop the compact disc, replay tracks on the compact disc that were played previously and eject the compact disc from the compact disc player.

6. The control panel as recited in claim 5, wherein the exercise switchpad is located near the center of the upper surface.

7. The control panel as recited in claim 5, wherein the lever switch is located near the center of the upper surface.

8. The control panel as recited in claim 5, wherein the lever switch is located near the center of the upper surface.

* * * * *